(12) United States Patent
Chen et al.

(10) Patent No.: US 6,840,677 B2
(45) Date of Patent: Jan. 11, 2005

(54) CERAMIC BEARING STRUCTURE

(75) Inventors: Weim Chen, Taipei Hsien (TW); Oscar Lee, Taipei Hsien (TW); San Lin, Tao Yuan (TW); Mark Chou, Taipei Hsien (TW)

(73) Assignee: ACT-RX Technology Corporation, Taipei Hsien (TW)

( * ) Notice: Subject to any disclaimer, the term of this patent is extended or adjusted under 35 U.S.C. 154(b) by 87 days.

(21) Appl. No.: 10/424,778

(22) Filed: Apr. 29, 2003

(65) Prior Publication Data

US 2004/0008915 A1 Jan. 15, 2004

(30) Foreign Application Priority Data

Jul. 12, 2002 (TW) ..................................... 91210652 U (51) Int. Cl.[7] ............................................. F16C 33/10
(52) U.S. Cl. ..................... 384/397; 384/297; 384/907.1
(58) Field of Search ................................. 384/297, 397, 384/286, 907.1

(56) References Cited

U.S. PATENT DOCUMENTS

| | | | | |
|---|---|---|---|---|
| 1,783,535 A | * | 12/1930 | Ehrenfeld | 384/397 |
| 2,053,848 A | * | 9/1936 | Seyfried | 384/397 |
| 5,697,709 A | * | 12/1997 | Mori et al. | 384/297 |

* cited by examiner

Primary Examiner—Thomas R. Hannon
(74) Attorney, Agent, or Firm—Browdy and Neimark, P.L.L.C.

(57) ABSTRACT

A ceramic bearing structure is constructed to include an axle bush having an axially extended axle hole, and an axle pivoted to the axle hole of the axle bush, the axle bush having a radial open chamber extended across the axle hole. The radial open chamber diminishes the material of the axle bush, reduces the contact area between the axle and the axle bush, and provides a spacious lubrication grease accumulation chamber.

14 Claims, 10 Drawing Sheets

CERAMIC BEARING STRUCTURE

BACKGROUND OF THE INVENTION

1. Field of the Invention

The present invention relates to ceramic bearing devices for use in a diskdrive, disk player, computer cooling fan, or the like and, more particularly, to such a ceramic bearing structure, which produces less noise during working.

2. Description of the Related Art

Following fast development of high technology, the operation speed of electric and electronic apparatus is required to be as faster as possible. For example, an advanced disk access device has a high memory space and high magnetic track density; therefore, the searching and read/write speed should be relatively faster. Further, in order to minimize space occupation, mobile apparatus are made as smaller as possible. Further, in order to dissipate heat during the operation of a high-precision electronic apparatus, a cooling fan may be used. The quality of bearings determines the performance of a diskdrive or cooling fan. A good quality bearing produces less friction resistance and noise during a high-speed rotation.

Figure 1:
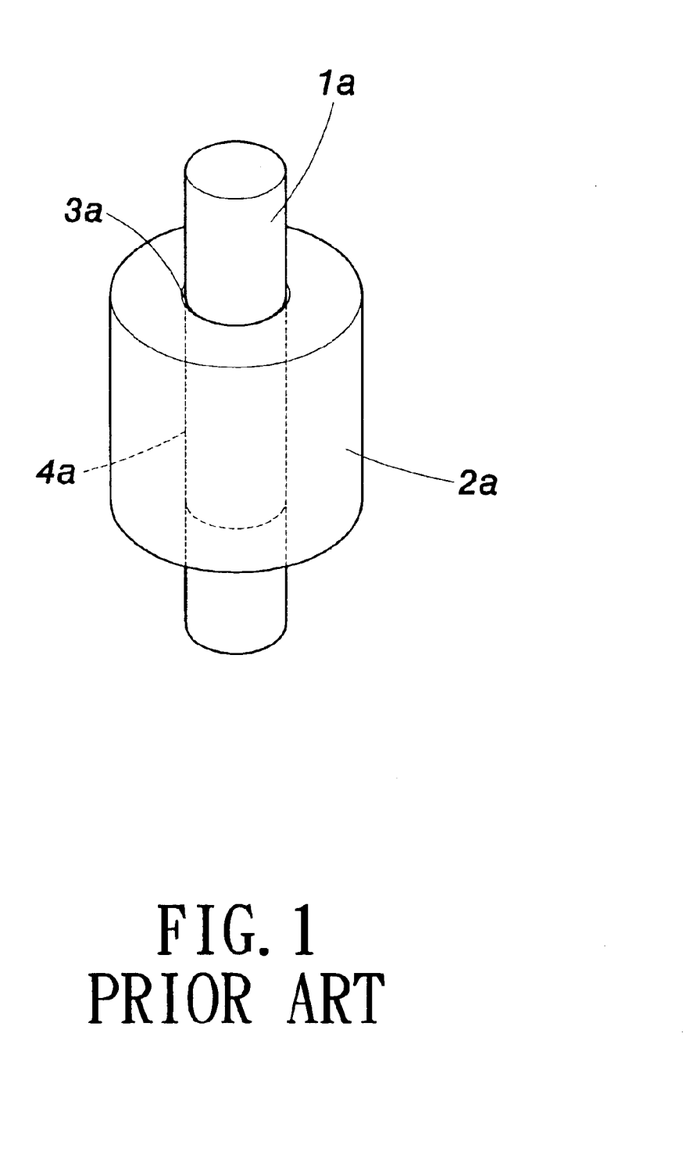
FIG. 1 is a perspective view of a bearing structure according to the prior art.

FIG. 1 illustrates a bearing structure for use in a high-precision electronic apparatus according to the prior art. According to this design, the bearing structure comprises an axle 1a and an axle bush 2a. The axle bush 2a has an axle hole 3a, which receives the axle 1a. During rotation of the bearing, the axle 1a is forced to contact or rub against and the inside wall 4a of the axle bush 2a. The crevice between the axle 1a and the axle bush 2a causes the axle 1a and the axle bush 2a to vibrate relative each other and to further produce noise during rotation of the bearing. Because the axle hole 3a axially extends through the ends of the axle bush 2a, the contact area between the axle 1a and the axle bush 2a cannot be reduced. During rotation of the bearing, much friction resistance is produced between the axle 1a and the axle bush 2a, releasing much heat. Because of the aforesaid reasons, the axle 1a and the axle bush 2a wear quickly with use.

Therefore, it is desirable to provide a ceramic bearing structure that eliminates the aforesaid drawbacks.

SUMMARY OF THE INVENTION

The present invention has been accomplished under the circumstances in view. It is therefore the main object of the present invention to provide a ceramic bearing structure, which reduces the contact area between the axle bush and the axle, so as to further improve the working efficiency of the bearing and minimize the production of noise during working of the bearing. It is another object of the present invention to provide a ceramic bearing structure, which diminishes the material consumption of the axle bush so as to further lower the manufacturing cost of the bearing structure. According to one aspect of the present invention, the ceramic bearing structure comprises A ceramic bearing structure comprising an axle bush, the axle bush having an axially extended axle hole, and an axle pivoted to the axle hole of the axle bush, wherein the axle bush has at least one open chamber radially extended across the axle hole, the at least one open chamber each having a radial width greater than the outer diameter of the axle and defining a space in the axle bush around the axle for accumulation of lubrication grease. According to another aspect of the present invention, the axle hole can be a through hole through two distal ends of the axle bush, or alternatively, a blind hole through one end of the axle bush only. According to still another aspect of the present invention, the axle bush can be made having a plurality of radial open chambers disposed at different elevations. The radial open chambers can be made having different dimensions.

DETAILED DESCRIPTION OF THE PREFERRED EMBODIMENT

FIGS. 2~5 illustrates different forms of ceramic bearing structure constructed according to $1^{st}$~$4^{th}$ embodiment of the present invention. As illustrated, a ceramic bearing structure in accordance with the present invention is comprised of an axle 1 and an axle bush 2. The axle bush 2 has an axially extended axle hole 3. The axle 1 is pivotally mounted in the axle hole 3 of the axle bush 2.

Further, the axle bush 2 has a radial open chamber 5 extended across the axle hole 3. The radial width of the radial open chamber 5 is greater than the diameter of the axle 1 so that the inside wall 4 of the axle bush 2 defines a crevice 6 around the axle 1. The radial open chamber 5 divides the axle bush 2 into an upper bearing wall 7 and a lower bearing wall 8. The upper bearing wall 7 and the lower bearing wall 8 support the axle 1 in the axle hole 3. The formation of the radial open chamber 5 in the axle bush 2 across the axle hole 3 greatly diminishes the material consumption of the axle bush 2 and, reduces the contact area between the axle bush 2 and the axle 1. Therefore, less friction resistance is produced during rotation of the bearing. Further, the crevice 6 also functions to accumulate lubricating grease. During rotation of the bearing, an oil layer is formed between the axle 1 and the axle bush 2 to protect the contact area of the bearing and to absorb shocks.

Figure 6:
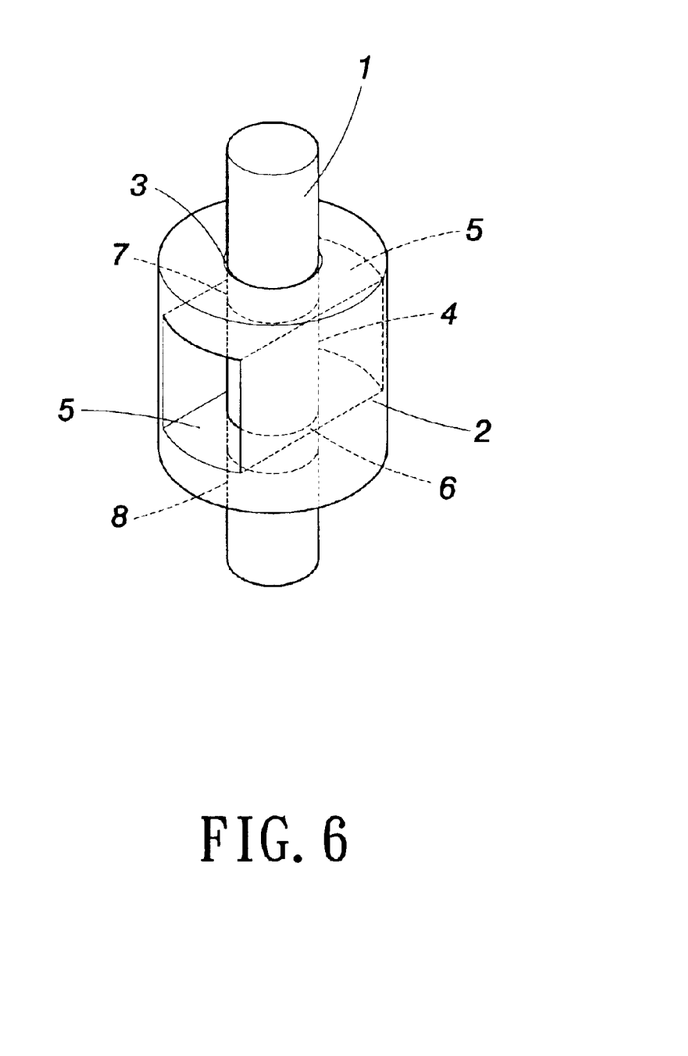
FIG. 6 is a perspective view of a ceramic bearing structure according to the fifth embodiment of the present invention.

FIG. 6 shows the fifth embodiment of the present invention. According to this embodiment, the radial open chamber 5 is a radial through hole extending through two opposite sides of the periphery of the axle bush 2. This embodiment has a relatively spacious lubricating grease accumulation chamber.

Figure 7:
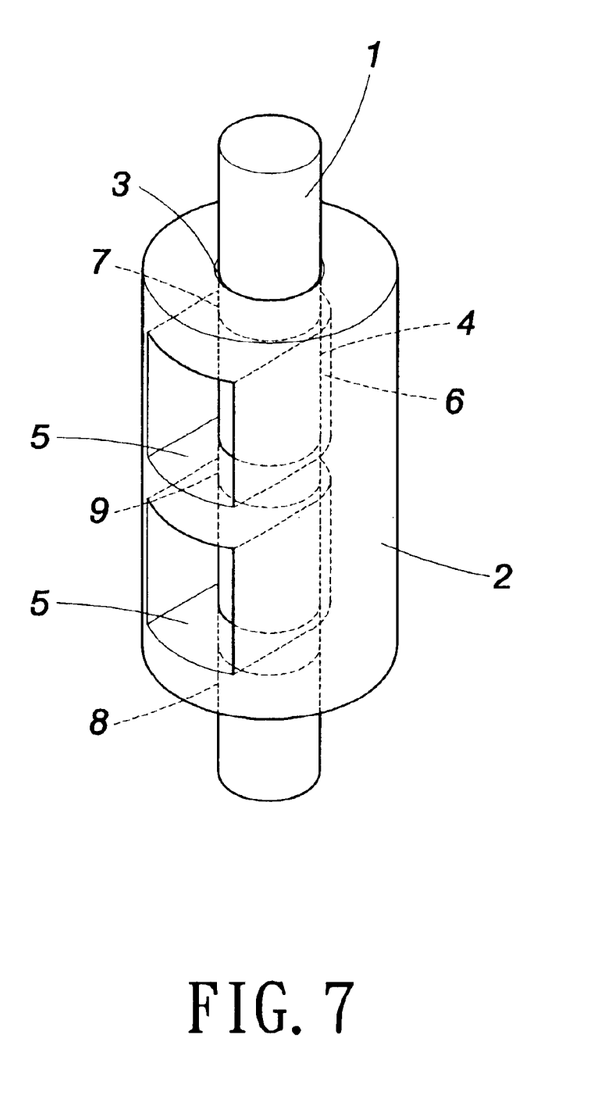
FIG. 7 is a perspective view of a ceramic bearing structure according to the sixth embodiment of the present invention.

FIG. 7 shows the sixth embodiment of the present invention. According to this embodiment, the axle bush 2 has two radial open chambers 5 disposed at different elevations and separated by a transverse partition wall 9. The transverse partition wall 9 work with the upper bearing wall 7 and the lower bearing wall 8 to support the axle 1 in the axle hole 3. This embodiment enables the axle bush 2 to support the axle 1 stably, preventing deformation of the axle 1. Further, this embodiment greatly increases the lubrication grease accumulation space in the axle bush 2.

Figure 8:
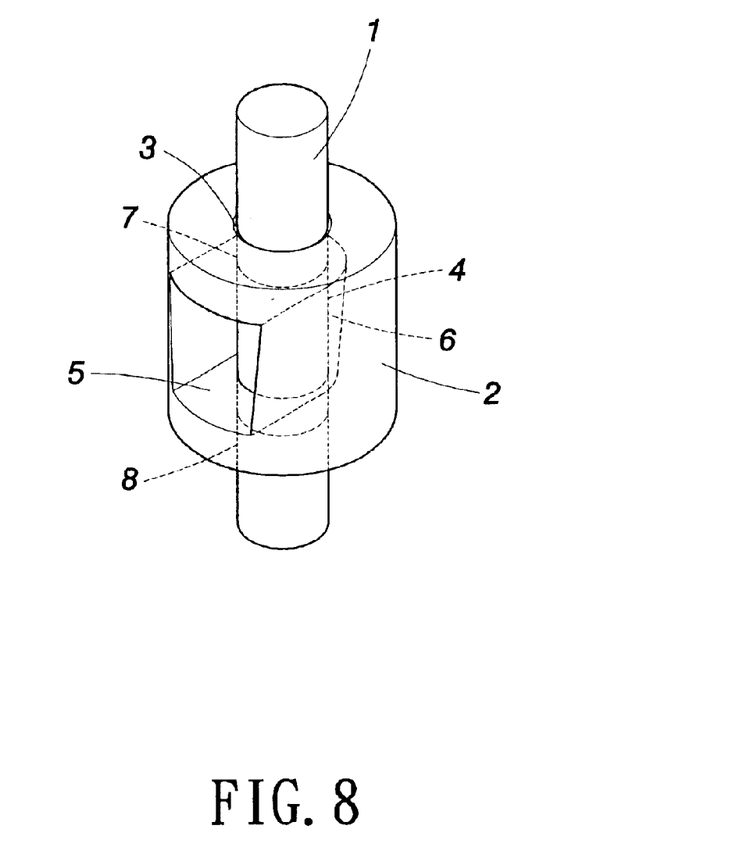
FIG. 8 is a perspective view of a ceramic bearing structure according to the seventh embodiment of the present invention.

FIG. 8 shows the seventh embodiment of the present invention. According to this embodiment, the peripheral walls of the radial open chamber 5 are not symmetrical, such that the upper bearing wall 7 and the lower bearing wall 8 have different structural strengths and, the lubrication grease accumulation space varies with the elevation of the crevice 6.

Figure 9:
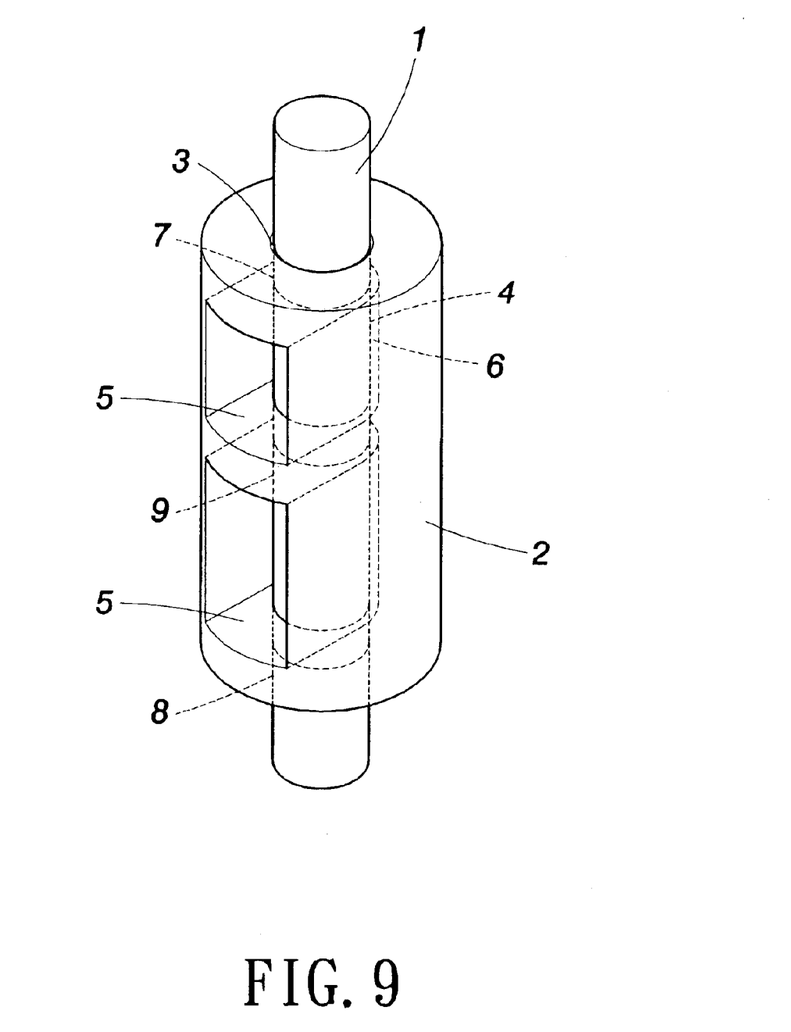
FIG. 9 is a perspective view of a ceramic bearing structure according to the eighth embodiment of the present invention.

FIG. 9 shows the eighth embodiment of the present invention. This embodiment is similar to the aforesaid sixth embodiment of FIG. 7. However, the two radial open chambers 5 of this eighth embodiment have different heights (longitudinal lengths).

Figure 10:
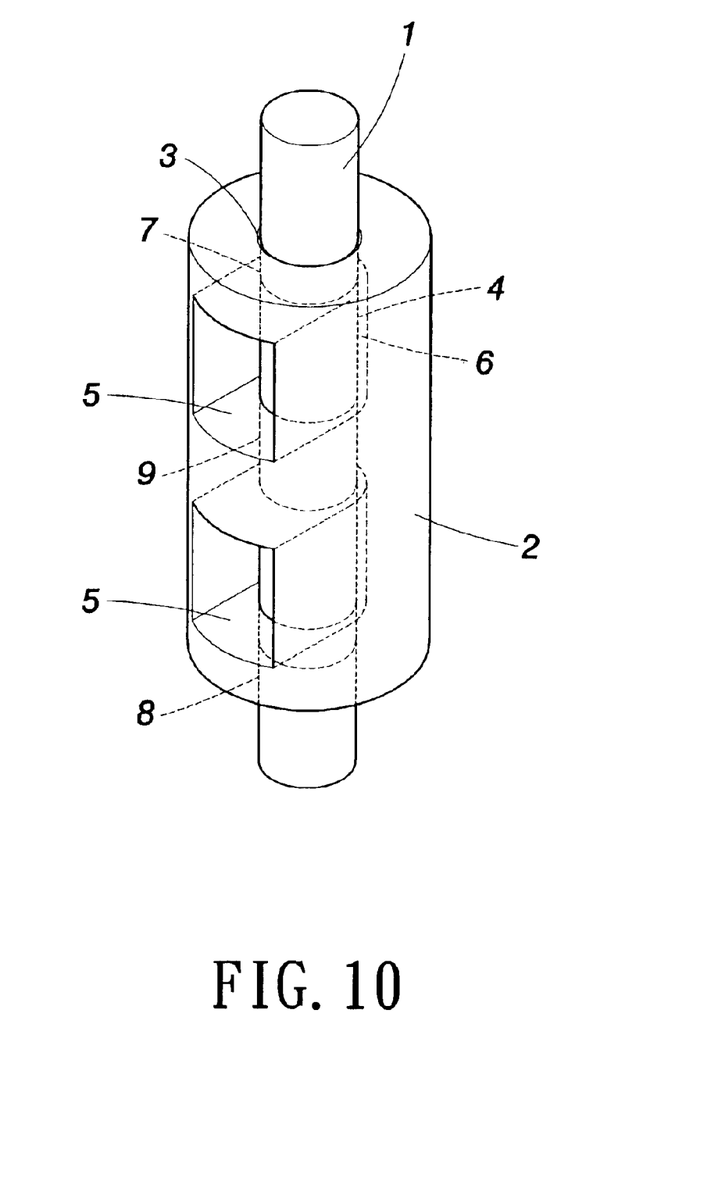
FIG. 10 is a perspective view of a ceramic bearing structure according to the ninth embodiment of the present invention.

FIG. 10 shows the ninth embodiment of the present invention. This embodiment is similar to the to the aforesaid sixth embodiment of FIG. 7 with the exception of the wall thickness of the transverse partition wall 9.

Figure 2:
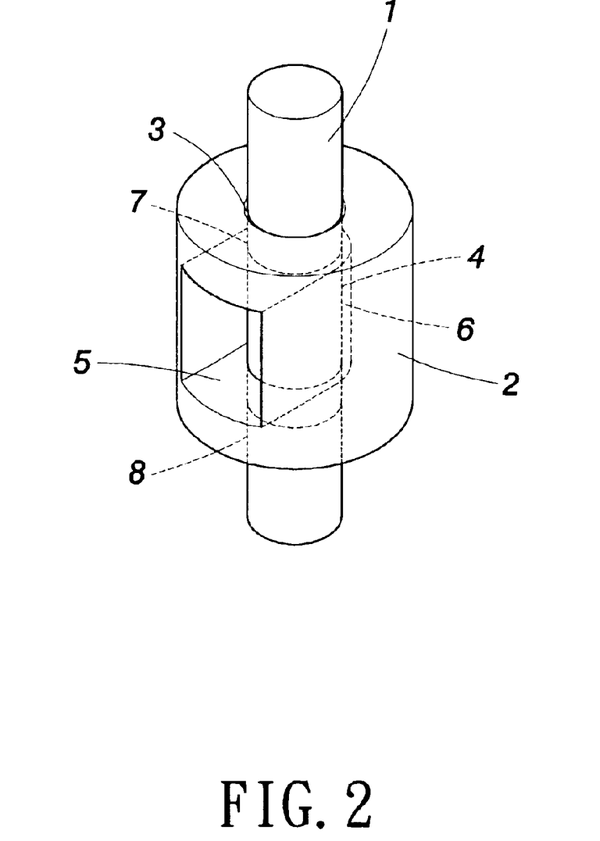
FIG. 2 is a perspective view of a ceramic bearing structure according to the first embodiment of the present invention.
Figure 3:
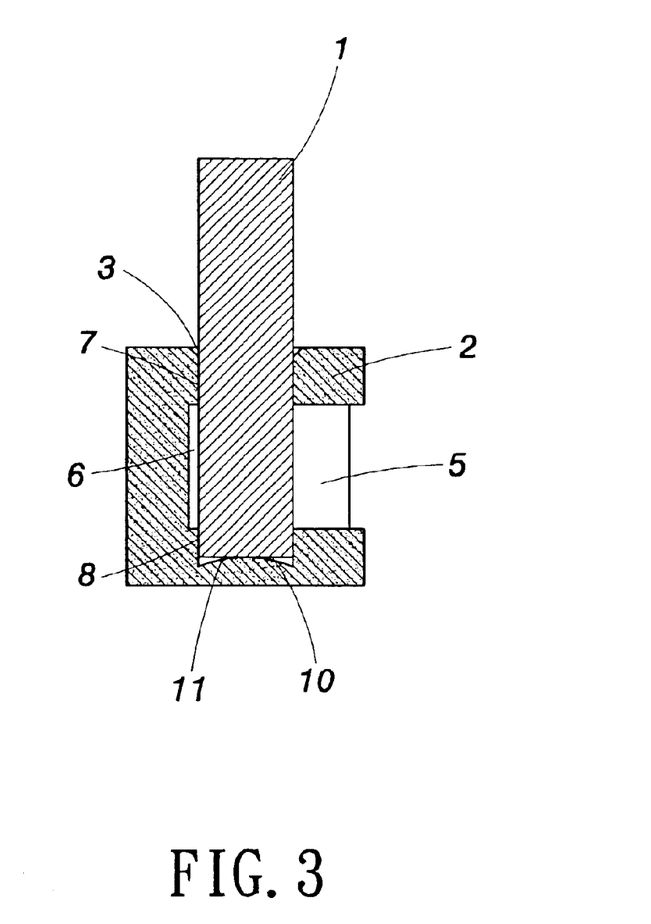
FIG. 3 is a sectional assembly view of a ceramic bearing structure according to the second embodiment of the present invention.
Figure 4:
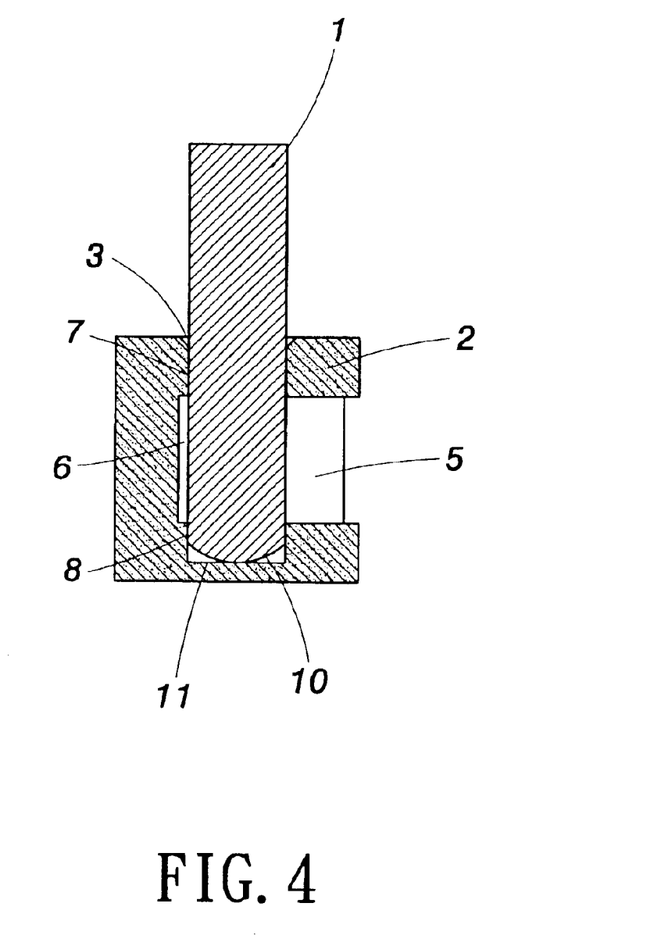
FIG. 4 is a sectional assembly view of a ceramic bearing structure according to the third embodiment of the present invention.
Figure 5:
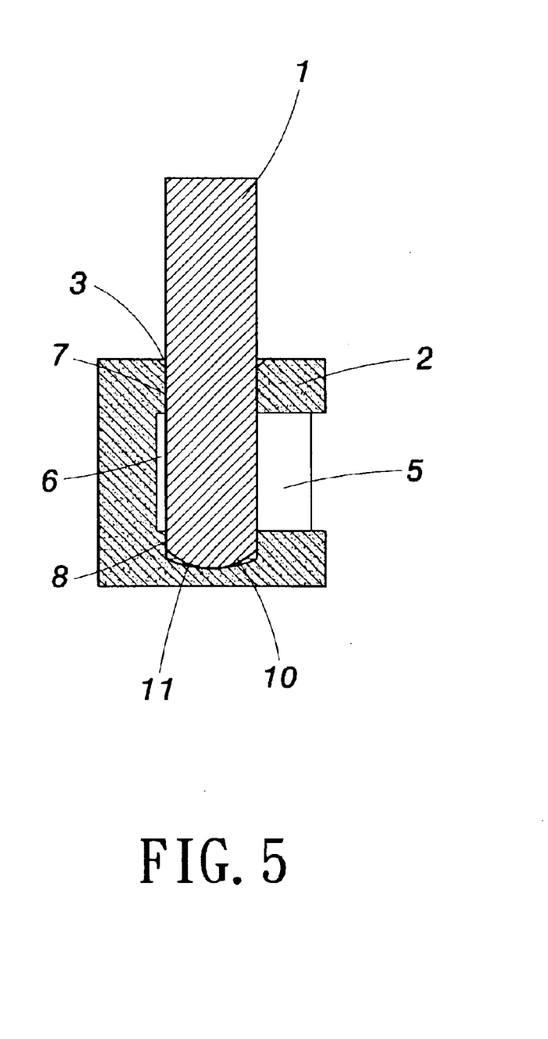
FIG. 5 is a sectional assembly view of a ceramic bearing structure according to the fourth embodiment of the present invention.

Referring to FIGS. 2~5, the bottom end 10 of the axle 1 can be a flat end as shown in FIG. 3, or rounded end as shown in FIG. 4. Further, the axle hole 3 of the axle bush 2 can be a through hole axially extending through two distal ends of the axle bush 2 as shown in FIG. 2. Alternatively, the axle hole 3 can be a blind hole extending through the upper bearing wall 7 without piercing the lower bearing wall 8. In this case, a recess 11 is formed in the lower bearing wall 8 inside the radial open chamber 5 for the positioning of the bottom end 10 of the axle 1. The recess 11 can be made having a convex bottom wall (see FIG. 3), a flat bottom wall (see FIG. 4), or a concave bottom wall (see FIG. 5).

As indicated above, the invention achieves the following advantages:
1. The hollow design of the axle bush minimizes the contact area between the axle bush and the axle, resulting in low friction resistance and noise.
2. The presence of multiple radial open chambers enables the axle to be stably supported in the axle bush at multiple bearing points.
3. The hollow design of the axle bush diminishes the consumption of material, and reduces the weight of the bearing.
4. The hollow design of the axle bush enables the axle bush to accumulate a big amount of lubrication grease.
5. The blind hole design of the axle hole enables the axle to be stably supported in the axle bush and smoothly rotated in the axle hole.

A prototype of ceramic bearing structure has been constructed with the features of the annexed drawings of FIGS. 2~10. The ceramic bearing structure functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A ceramic bearing structure comprising an axle bush, said axle bush having an axially extended axle hole, and an axle pivoted to the axle hole of said axle bush, wherein said axle bush has at least one open chamber radially extended across said axle hole, said at least one open chamber each having a radial width greater than the outer diameter of said axle and defining a space in said axle bush around said axle for accumulation of lubrication grease.

2. The ceramic bearing structure as claimed in claim 1, wherein said at least one open chamber each extends through two opposite sides of the periphery of said axle bush.

3. The ceramic bearing structure as claimed in claim 1, wherein said at least one open chamber each have asymmetric peripheral walls.

4. The ceramic bearing structure as claimed in claim 1, wherein said open chambers divide said axle bush into a plurality of bearing walls that support said axle.

5. The ceramic bearing structure as claimed in claim 1, wherein said axle has a flat bottom end supported in said axle hole inside said axle bush.

6. The ceramic bearing structure as claimed in claim 1, wherein said axle hole is a blind hole axially extended through one end of said axle bush.

7. The ceramic bearing structure as claimed in claim 1, wherein said at least one open chamber includes a plurality of open chambers respectively extended across said axle hole at different elevations.

8. The ceramic bearing structure as claimed in claim 7, wherein said open chambers divide said axle bush into a plurality of bearing walls that support said axle.

9. The ceramic bearing structure as claimed in claim 7, wherein said open chambers have different dimensions.

10. The ceramic bearing structure as claimed in claim 9, wherein said bearing walls have different wall thickness.

11. The ceramic bearing structure as claimed in claim 1, wherein said axle has a rounded bottom end supported in said axle hole inside said axle bush.

12. The ceramic bearing structure as claimed in claim 11, wherein said axle bush further comprises a recess aimed at said axle hole and adapted to accommodate one end of said axle, said recess having a bottom wall curved outwards.

13. The ceramic bearing structure as claimed in claim 11, wherein said axle bush further comprises a recess aimed at said axle hole and adapted to accommodate one end of said axle, said recess having a flat bottom wall curved outwards.

14. The ceramic bearing structure as claimed in claim 11, wherein said axle bush further comprises a recess aimed at said axle hole and adapted to accommodate one end of said axle, said recess having a flat bottom wall curved inwards.

* * * * *